United States Patent [19]
Kim

[11] Patent Number: 5,883,372
[45] Date of Patent: Mar. 16, 1999

[54] SMART CARD SYSTEM WITH SLIDE CONTACT PROTECTION

[75] Inventor: Jeong-Geun Kim, Kyeongki-Do, Rep. of Korea

[73] Assignee: Daewoo Electronics Co., Ltd., Seoul, Rep. of Korea

[21] Appl. No.: 774,026

[22] Filed: Dec. 27, 1996

[30] Foreign Application Priority Data

Dec. 29, 1995 [KR] Rep. of Korea .................. 1995-66427

[51] Int. Cl.[6] .............................. G06K 7/06; G06K 13/04
[52] U.S. Cl. ........................ 235/441; 235/442; 235/479; 235/482
[58] Field of Search ................................... 235/441, 442, 235/475, 479, 482

[56] References Cited

U.S. PATENT DOCUMENTS

| | | | |
|---|---|---|---|
| 4,695,925 | 9/1987 | Kodaj | 235/492 |
| 4,833,310 | 5/1989 | Shimamura et al. | 235/479 |
| 4,839,509 | 6/1989 | Yasuma et al. | 235/482 |
| 4,904,852 | 2/1990 | Mita et al. | 235/479 |
| 5,043,562 | 8/1991 | Hautvast et al. | 235/441 |

*Primary Examiner*—Donald T. Hajec
*Assistant Examiner*—Jacob Eisenberg
*Attorney, Agent, or Firm*—Pennie & Edmonds LLP

[57] ABSTRACT

A card system prevents contacts of a smart card from being scratched by contact members of a card reader to prevent the smart card from malfunctioning. The smart card system includes a smart card having contacts and a perforation hole therein, a card reader body formed at an upper surface thereof with an aperture, a contact frame disposed within the aperture and having a plurality of contact members attached thereto so as to contact the contacts, a slide protrusion inserted into the perforation hole of the smart card when the smart card reaches a reading position in the card reader, and a detect switch for detecting the insertion of the smart card. The smart card system prevents the contacts of the smart card from being damaged, so that a malfunction of the smart card can be prevented. The smart card system has a simple construction, so it can be easily manufactured at a low cost.

9 Claims, 4 Drawing Sheets

SMART CARD SYSTEM WITH SLIDE CONTACT PROTECTION

BACKGROUND OF THE INVENTION

1. Field of the Invention

The present invention relates to a smart card system, and more particularly to a smart card system that can prevent scratching of contacts of a smart card by contact members of a card reader while the smart card is being inserted into or taken out of the card reader, thereby reducing damage to the contacts and preventing a malfunction of an electric signal between contacts and a detect switch.

2. Prior Arts

As is well known, a smart card system includes a smart card having an integral circuit therein, and a card reader for reading and/or writing information stored in the integral circuit of the smart card. Recently, such smart card system is widely used as a means for watching a pay-per-view program of a satellite-based broadcasting station, and as a means for managing information about subscribers.

Generally, the integral circuit includes a PROM (programmable read only memory), a RAM(random access memory) and a CPU(central processing unit). The smart card has a plurality of contacts connected to the integral circuit, and the card reader has contact members that contact the contacts of the smart card. When the smart card is inserted into the card reader, the card reader reads information stored in the PROM and the RAM, and sends an electric signal, such as a control signal, to a writing device.

FIGS. 5 to 8 show a conventional smart card system. As shown in FIG. 5 a conventional smart card system 500 includes a smart card 510 and a card reader 515. Smart card 510 is formed therein with an integral circuit section 512 having a PROM, a RAM and a CPU. A plurality of contacts 514, which are connected to integral circuit section 512, are arranged on an upper surface of smart card 510.

Card reader 515 comprises an upper frame 520 and a lower frame 550. When assembled together, upper and lower frames 520 and 550 form an insertion hole 522, into which smart card 510 is inserted. Upper frame 520 of card reader 515 is formed at an upper surface thereof with first and second apertures 524 and 526. First aperture 524 is separated from second aperture 526 by a guide bar 540. A plurality of first and second contact members 542 and 544 are provided in card reader 515 so as to make contact with contacts 514 of smart card 510. First ends of first and second contact members 542 and 544 are respectively embedded into first and second side bars 532 and 534 which are constituting parts of upper frame 520. In addition, second ends of first and second contact members 542 and 544 extend up to guide bar 540 by crossing first and second apertures 524 and 526, respectively.

The second ends of first and second contact members 542 and 544 are bent in an arc shape and are seated on an upper surface of lower frame 550 so that they can with contact with contacts 514 of smart card 510 when smart card 510 has been inserted into card reader 515. In general, the number of first and second contact members 542 and 544 is equal to the number of contacts 514.

In addition, at a predetermined position of an under surface of 534, there is provided a detect switch 530 for detecting the insertion of smart card 510. Guide bar 540 is formed with a plurality of guide slots for guiding the upward movement of first and second contact members 542 and 544.

FIGS. 6 to 8 are sectional views showing smart card 510 in the process of being inserted into card reader 515. While smart card 510 is being moved to a first position in card reader 515 as shown in FIG. 6, a lead end of smart card 510 makes sliding-contact with the second ends of first contact members 542, which are seated on the upper surface of lower frame 550. Thereby the second ends of first contact members 542 move upward along the guide slots of guide bar 540.

Then, while smart card 510 is being moved to a second position in card reader 515 as shown in FIG. 7, the lead end of smart card 510 makes sliding-contact with the second ends of second contact members 544, which are also seated on the upper surface of lower frame 550, thereby the second ends of second contact members 544 moving upward along the guide slots of guide bar 540.

When smart card 510 reaches a third position in card reader 515 as shown in FIG. 8, that is a reading position, the second ends of first and second contact members 542 and 544 with contact with contacts 514 provided on the upper surface of smart card 510. At this time, the lead end of smart card 510 pushes detect switch 530 disposed at a terminal end of card reader 515, so detect switch 530 begins to switch on.

As detect switch 530 is switching on, card reader 515 reads information stored in integral circuit section 512 of smart card 510 through first and second contact members 542 and 544 contacted with contacts 514, and sends an electric signal based on the information to a writing device.

However, in smart card system 500, contacts 514 of smart card 510 make slide-contact with first and second contact members 542 and 544 of card reader 515, so that first and second contact members 542 and 544 scratch contacts 514 of smart card 510 while smart card 510 is being moved to the reading position in card reader 515, thereby resulting in damage to contact 514.

Particularly, when smart card system 500 is used for the purpose of watching the pay-per-view programs of a satellite-based broadcasting station, this kind of damage to contacts 514 may vary characteristics of an electrical control signal, thereby resulting in a malfunction such as an inferior picture or noise.

On the other hand, U.S. Pat. No. 4,839,509 issued to Yasuma et al. discloses a connector device for preventing contacts of a smart card from being damaged. However, Yasuma's connector device requires a plurality of mechanical parts so as to move the smart card to the reading position. For this reason, Yasuma's connector has a complicated structure and a large size.

SUMMARY OF THE INVENTION

The present invention has been made to solve the problems of the prior arts, and accordingly, it is an object of the present invention to provide a smart card system that can prevent contacts of a smart card from being damaged, and which has a simple construction.

To accomplish the above object of the present invention, there is provided a smart card system comprising:

a smart card having an integral circuit, a plurality of contacts connected to the integral circuit, and a perforation hole formed in a vicinity of the contacts;

a card reader having a card reader body, the card reader body including an upper frame and a lower frame, the lower frame being assembled with the upper frame in order to form an insertion hole into which the smart card is inserted, the upper frame being formed at an upper surface thereof with an aperture;

a contact frame disposed with the aperture, the contact frame having a plurality of contact members attached thereto, the contact members extending downward and being spaced at a predetermined distance apart from an upper surface of the lower frame; and a slide protrusion integrally formed on an under surface of the contact frame and extending to the upper surface of the lower frame, the slide protrusion being inserted into the perforation hole of the smart card when the smart card reaches a reading position in the card reader.

According to a preferred embodiment of the present invention, a first end of contact member is embedded into the contact frame, the second end of the contact member is bent in an arc shape so as to make slide-contact with the smart card.

The aperture is provided at side walls thereof with a pair of guide recesses, and first and second ends of the contact frame are respectively engaged with the guide recesses in such a manner that they move up and down therein while maintaining a horizontal balance.

First and second springs for downwardly biasing the contact frame are respectively installed on upper surfaces of the first and second ends of the contact frame. In addition, first and second spring caps for receiving the first and second springs are respectively mounted on the first and second springs.

The slide protrusion is provided at a terminal end thereof with a rounding portion that makes slide-contact with the smart card.

The smart card system having the above construction operates as follows.

Firstly, when the smart card moves to a predetermined position in the card reader, the second ends of the contact members make slide-contact with a lead end of the smart card, thereby moving upward.

At this time, the contact frame also moves upward along guide recesses while overcoming the biasing force of the first and second springs.

Then, the smart card makes slide-contact with the rounding portion of the slide protrusion and moves beyond the slide protrusion, so that the contact frame moves further upward. At this time, the second ends of the contact members do not contact the upper surface of the smart card.

When smart card reaches a reading position, the slide protrusion is inserted into the perforation hole of the smart card by means of the biasing force of the first and second springs. As the slide protrusion is being inserted into the perforation hole, the contact members move downward, thereby contacting the contacts of the smart card. Accordingly, the contact members can with contact with the contacts of the smart card without scratching the contacts.

In this manner, the smart card system according to the present invention can prevent the contacts of the smart card from being damaged, so a malfunction of the smart card can be prevented.

Furthermore, the smart card system of the present invention has a simple construction, so the smart card system can be easily manufactured at a low cost.

BRIEF DESCRIPTION OF THE DRAWINGS

The above object and other advantages of the present invention will become more apparent by describing in detail a preferred embodiment thereof with reference to the attached drawings, in which.

DETAILED DESCRIPTION OF THE INVENTION

Hereinafter, the present invention will be described in detail with reference to the accompanying drawings.

Figure 1:
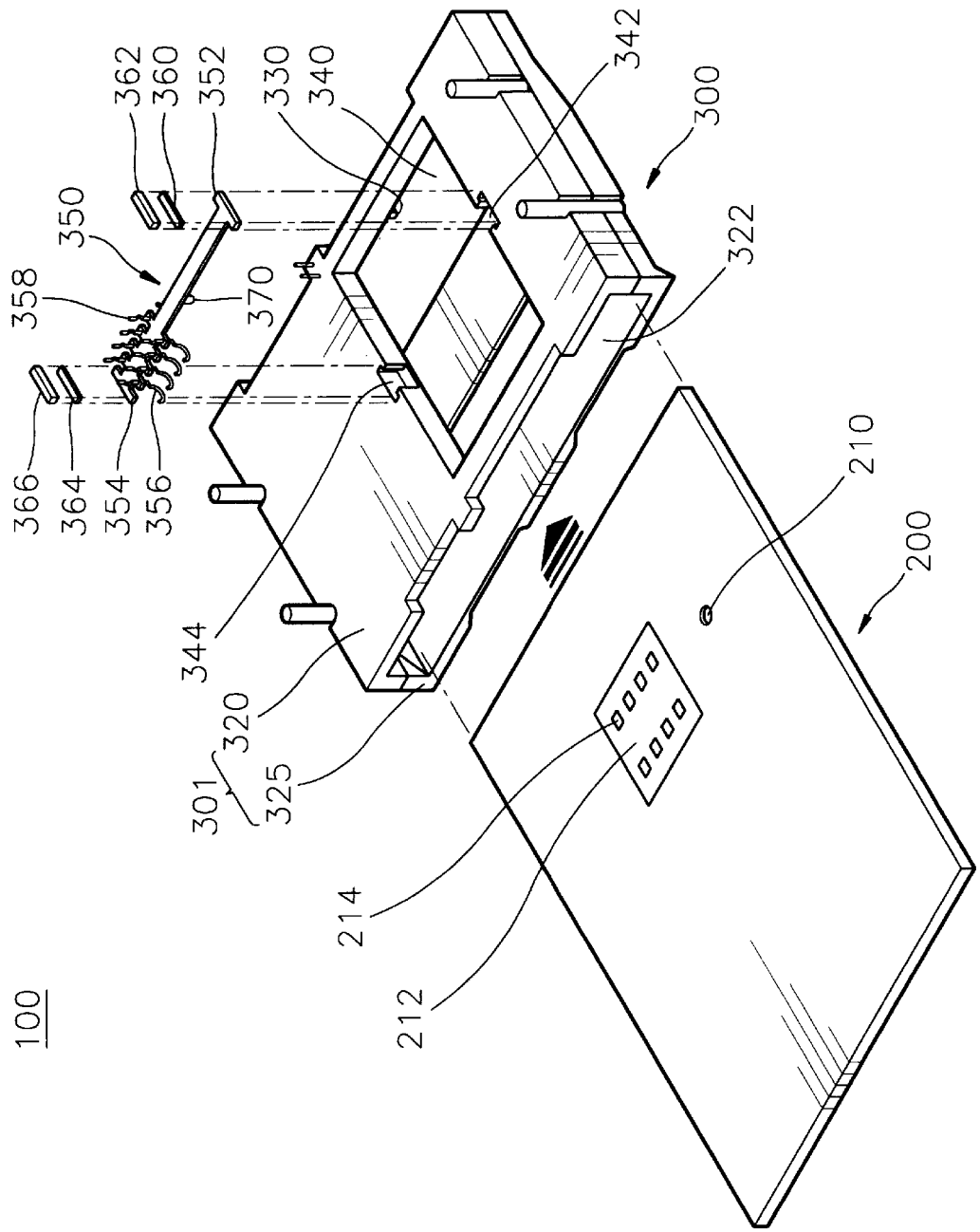
FIG. 1 is an exploded view showing a construction of a smart card system according to one embodiment of the present invention.

FIG. 1 shows a smart card system 100 according to one embodiment of the present invention, As shown in FIG. 1, smart card system 100 includes a smart card 200 and a card reader 300. Smart card 200 is formed therein with an integral circuit section 212 having a PROM, a RAM and a CPU. A plurality of contacts 214, which are connected to integral circuit section 212, are arranged on an upper surface of smart card 200. Smart card 200 has a perforation hole 210 in the vicinity of contacts 214.

Card reader 300 comprises a card reader body 301 including an upper frame 320 and a lower frame 325. When assembled together, upper and lower frames 320 and 325 form an insertion hole 322, into which smart card 200 is inserted. Upper frame 320 of card reader 300 is formed at an upper surfacer thereof with an aperture 340. Aperture 340 is proved at side walls thereof with a pair of guide recesses 342 and 344. A contact frame 350 is disposed within aperture 340. First and second ends 352 and 354 of contact frame 350 are respectively engaged with guide recesses 342 and 344 in such a manner that they can move up and down therein while maintaining a horizontal balance.

Each of first and second ends 352 and 354 of contact frame 350 has a shape corresponding to shapes of guide recesses 342 and 344. Though first and second ends 352 and 354 of contact frame 350, and guide recesses 342 and 344 are illustrated as rectangular shaped in FIG. 1, their shapes can be varied according to embodiments of the present invention. For example, they can be formed as semi-circular shapes.

A plurality of first and second contact members 356 and 358, which are manufactured with an elastic material, are provided in card reader 300 so as to contact with contacts 214 of smart card 200. First and second contact members 356 and 358 are spaced at a predetermined space apart from each other in such a manner that they can be positioned in correspondence to positions of contacts 214 of smart card 200. First ends of first and second contact members 356 and 358 are respectively embedded into contact frame 350. In addition, second ends of first and second contact members 356 and 358 extend downward, but do not contact an upper surface of lower frame 325.

The second ends of first and second contact members 356 and 358 are bent in an arc shape in such a manner that they can make slide-contact with a lead end of smart card 200 when smart card 200 is inserted into insertion hole 322 of card reader 300. In addition, first and second contact members 356 and 358 are respectively formed at a predetermined position thereof with first and second concave portions 356A and 358A so as to facilitate an elastic-contact between smart card 200 and first and second contact members 356 and 358.

Figure 2:
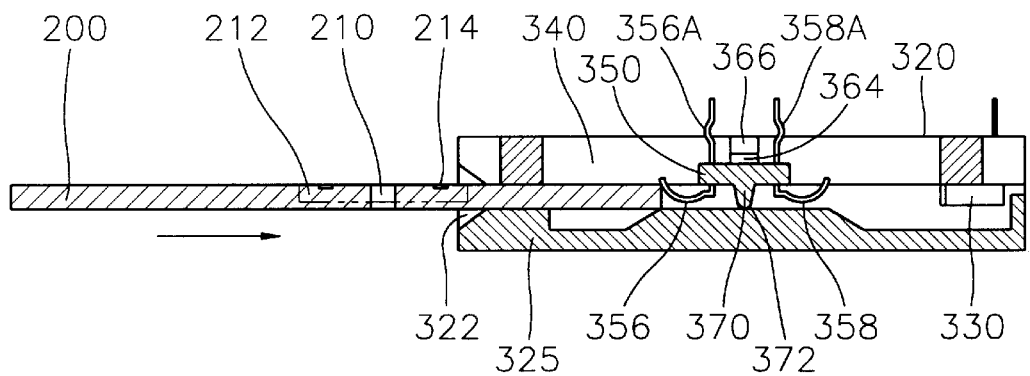
FIG. 2 is a sectional view showing a smart card inserted in a first position of a card reader.
Figure 3:
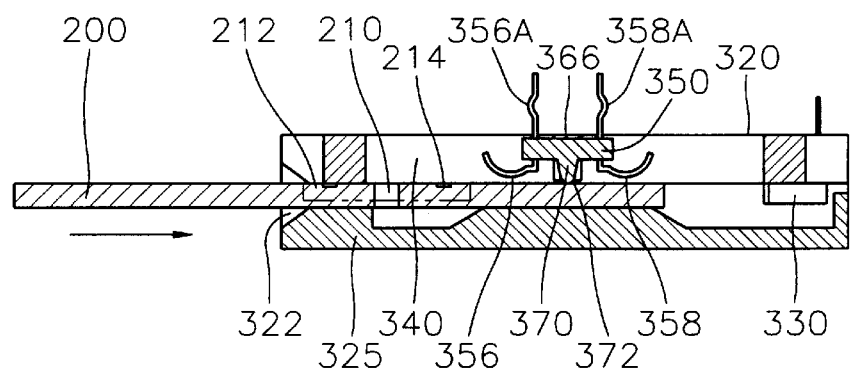
FIG. 3 is a sectional view showing a smart card inserted in a second position of a card reader.

As shown in FIGS. 2 and 3, while smart card 200 is inserted into card reader 300, first and second contact members 356 and 358 move upward, thereby moving contact frame 350 upward.

In general, the number of first and second contact members 356 and 358 is equal to the number of contacts 214. Though eight contacts and eight contact members are illustrated in this embodiment, according to another embodiment of the present invention, six or ten contacts and contact members can be provided.

Referring again to FIG. 1, first and second springs 360 and 364 for downwardly biasing contact frame 350 are respectively installed on upper surfaces of first and second ends 352 and 354 of contact frame 350. First and second spring caps 362 and 366 for receiving first and second springs 360 and 364 therein are respectively mounted on first and second springs 360 and 364. In order to prevent contact frame 350 from being separated from guide recesses 342 and 344, first and second spring caps 362 and 366 are respectively secured to upper portions of guide recesses 342 and 344. According to a preferred embodiment of the present invention, first and second springs 360 and 364 include leaf springs.

On a predetermined position of an under surface of contact frame 350, there is provided a slide protrusion 370 that extends up to the upper surface of lower frame 325 and is inserted into perforation hole 210 of smart card 200 when smart card 200 has reached a reading position in card reader 300.

As detailedly shown in FIG. 2, slide protrusion 370 is provided at its terminal end with a rounding portion 372, which makes slide-contact with smart card 200. Rounding portion 372 permits smart card 200 to be inserted into and separated from the reading position.

Slide protrusion 370 is seated on the upper surface of lower frame 325 by means of a biasing force of first and second springs 360 and 364, and the second ends of first and second contact members 356 and 358 are spaced at a predetermined distance apart from the upper surface of lower frame 325. Accordingly, as shown in FIG. 3, while smart card 200 is inserted into card reader 300, the second ends of first and second contact members 356 and 358 do not contact the upper surface of smart card 200, so first and second contact members 356 and 358 do not scratch contacts 214 formed on smart card 200.

In addition, at a predetermined position of an under surface of upper frame 320, there is provided a detect switch 330 for detecting the insertion of smart card 200.

Figure 4:
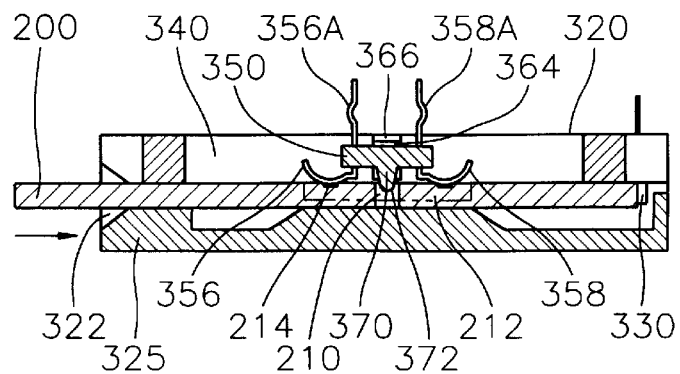
FIG. 4 is a sectional view showing a smart card inserted in a third position of a card reader.
Figure 5:
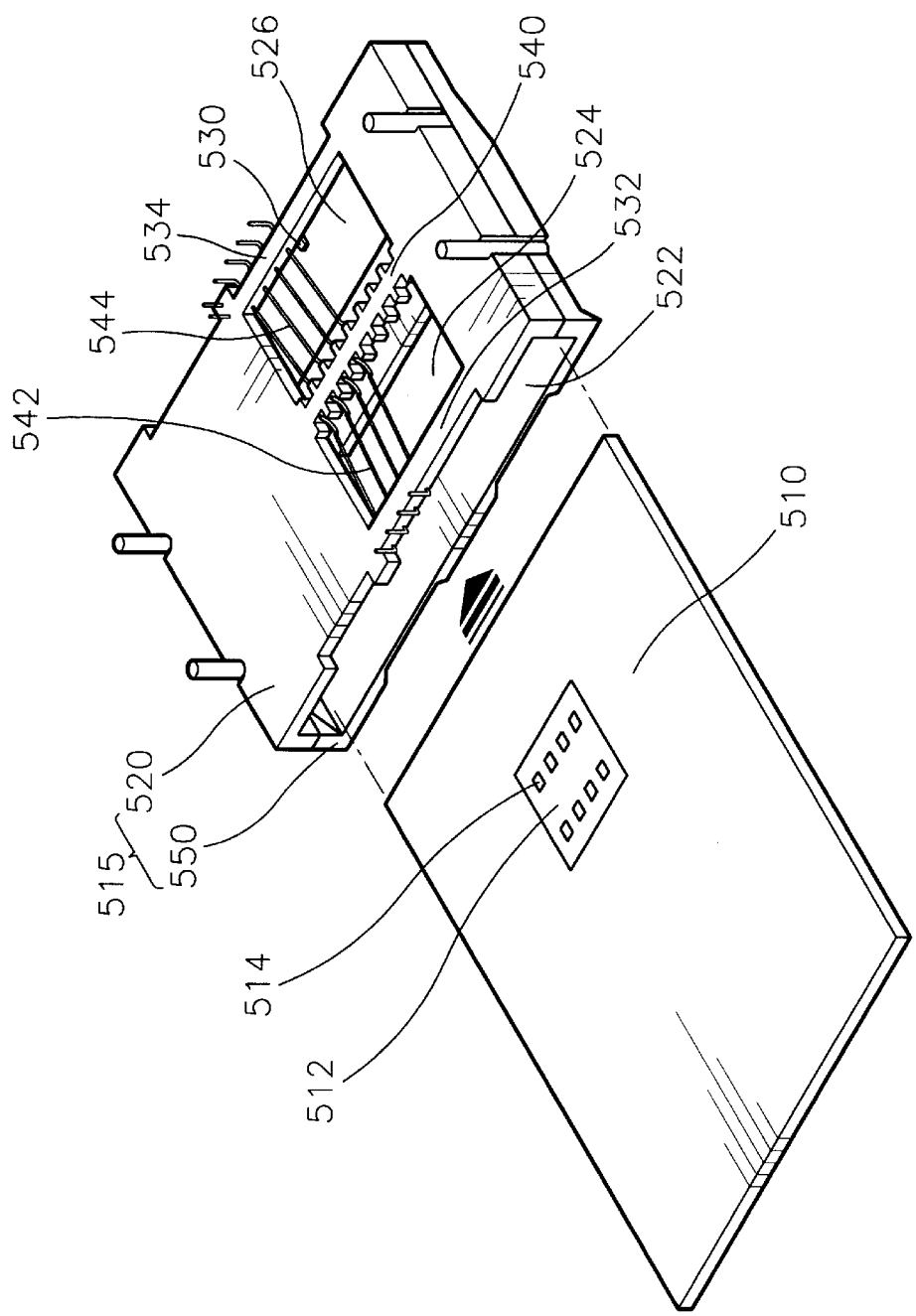
FIG. 5 is an exploded view showing a construction of a conventional smart card system.
Figure 6:
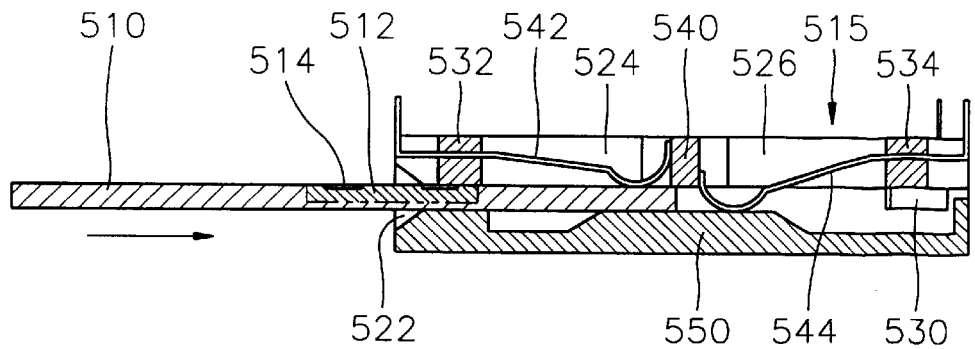
FIG. 6 is a sectional view showing a conventional smart card inserted in a first position of a conventional card reader.
Figure 7:
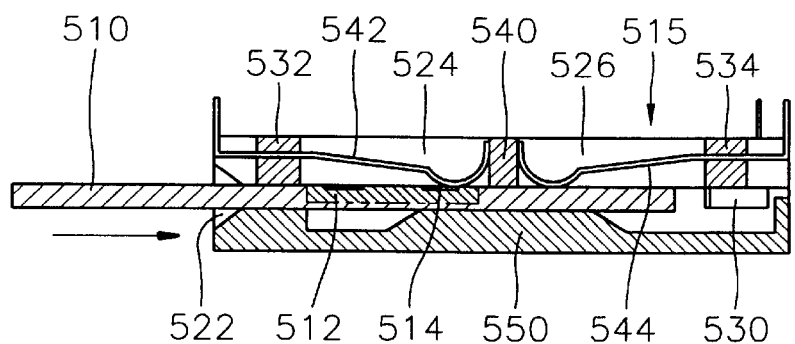
FIG. 7 is a sectional view showing a conventional smart card inserted in a second position of a conventional card reader.
Figure 8:
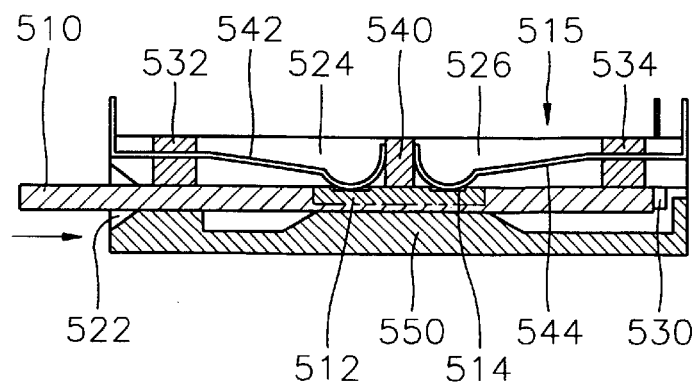
FIG. 8 is a sectional view showing a smart card inserted in a third position of a card reader.

FIGS. 2 to 4 are sectional views showing smart card 200 in the process of inserting into card reader 300. Hereinafter, the operation of smart card system 100 will be described with reference to FIGS. 2 to 4.

First, when smart card 200 moves to a first position in card reader 300 as shown in FIG. 2, the lead end of smart card 200 contacts the second ends of first contact members 356. As card reader 300 further moves from the first position into card reader 300, the second ends of first contact members 356 make slide-contact with the lead end of smart card 200 so that first contact members 356 move upward.

At this time, contact frame 350, which is securely coupled to first contact members 356, also moves upward along guide recesses 342 and 344 while overcoming the biasing force of first and second spring 360 and 364.

Then, as shown in FIG. 3, smart card 200 makes slide-contact with rounding portion 372 of slide protrusion 370 and moves to a second position in card reader 300 beyond slide protrusion 370, so that contact frame 350 moves further upward. At this time, the second ends of first and second contact members 356 and 358 do not contact the upper surface of smart card 200.

When smart card 200 reaches a third position in card reader 300 as shown in FIG. 4, that is a reading position, slide protrusion 370 is inserted into perforation hole 210 of smart card 200 by means of the biasing force of first and second springs 360 and 364.

As slide protrusion 370 is inserted into perforation hole 210, first and second contact members 356 and 358 move downward, and thereby contacts with contacts 214 of smart card 200. Accordingly, first and second contact members 356 and 358 can contact contacts 214 of smart card 200 without scratching contacts 214. At the same time, the lead end of smart card 200 pushes detect switch 330 disposed at the terminal end of card reader 300, so that detect switch 330 switches on.

As detect switch 330 is switching on, card reader 300 reads information stored in integral circuit section 212 of smart card 200 through first and second contact members 356 and 358 contacted with contacts 214, and sends an electric signal based on the information to a writing device.

In the same manner as the insertion of smart card 200 into card reader 300, the separation of smart card 200 from card reader 300 can be carried out without scratching contacts 214 of smart card 200.

As described above, the smart card system according to the present invention can prevent the contacts of the smart card from being damaged, so a malfunction of the smart card can be prevented.

Furthermore, the smart card system of the present invention has a simple construction, so the smart card system can be easily manufactured at a low cost.

Although the preferred embodiment of the invention has been described, it will be understood by those skilled in the art that the present invention should not be limited to the described preferred embodiment, but various changes and modifications can be made within the spirit and scope of the invention as defined by the appended claims.

What is claimed is:

1. A smart card system comprising:

a smart card having an integral circuit, a plurality of contacts connected to the integral circuit, and a perforation hole formed in a vicinity of the contacts;

a card reader having a card reader body, which includes an upper frame and a lower frame, the lower frame being assembled with the upper frame and forming an insertion hole into which the smart card is insertable, the upper frame being formed at an upper surface thereof with an aperture having a pair of guide recesses at side walls thereof;

a contact frame movably disposed within the aperture, first and second ends of the contact frame being respectively engaged with the guide recesses in a manner that enables the contact frame to move up and down along the guide recesses while maintaining a horizontal balance, the contact frame having a plurality of contact members attached thereto, the contact members extending downward and being spaced at a predetermined distance apart from an upper surface of the lower frame, each contact member having a concave portion at a predetermined position thereof to facilitate an elastic contact between the smart card and the contact members; and a slide protrusion integrally formed on an under surface of the contact frame and extending toward the upper surface of the lower frame, the slide protrusion being received in the perforation hole of the smart card when the smart card reaches a reading position in the card reader.

2. The smart card system as claimed in claim 1, wherein each contact member has first and second ends, the first end of each contact member being embedded into the contact frame, the second end of each contact member being bent in an arc shape to enable slide-contact with the smart card.

3. The smart card system as claimed in claim 1, further comprising first and second springs for downwardly biasing the contact frame, the first and second springs being respectively installed on upper surfaces of the first and second ends of the contact frame.

4. The smart card system as claimed in claim 3, wherein the first and second springs include leaf springs.

5. The smart card system as claimed in claim 3, further comprising first and second spring caps for receiving the first and second springs, the first and second spring caps being respectively mounted on the first and second springs.

6. The smart card system as claimed in claim 5, wherein the first and second spring caps are respectively secured to upper portions of the guide recesses.

7. The smart card system as claimed in claim 3, wherein the slide protrusion is provided at a terminal end thereof with a rounding portion that makes slide-contact with the smart card.

8. The smart card system as claimed in claim 1, wherein the contact members are made of an elastic material.

9. A smart card system comprising:

a smart card having an integral circuit, a plurality of contacts connected to the integral circuit, and a perforation hole formed in a vicinity of the contacts;

a card reader having a card reader body, which includes an upper frame and a lower frame, the lower frame being assembled with the upper frame and forming an insertion hole into which the smart card is insertable, the upper frame being formed at an upper surface thereof with an aperture;

a contact frame movably disposed with the aperture, the contact frame having a plurality of contact members attached thereto, the contact members extending downward and being spaced at a predetermined distance apart from an upper surface of the lower frame, the contact members being formed of an elastic material; and a slide protrusion integrally formed on an under surface of the contact frame and extending toward the upper surface of the lower frame, the slide protrusion being received in the perforation hole of the smart card when the smart card reaches a reading position in the card reader, the slide protrusion being provided at a terminal end thereof with a rounding portion that enables slide-contact with the smart card;

first and second springs for downwardly biasing the contact frame;

first and second spring caps for receiving the first and second springs; and a detect switch for detecting an insertion of the smart card, wherein each contact member has first and second ends, the first end of each contact member being embedded into the contract frame, the second end of each contact member being bent in an arc shape to enable slide-contact with the smart card, each contact member having a concave portion formed at a predetermined position thereof for facilitating an elastic contact between the smart card and the contact members, the aperture having a pair of guide recesses at side walls thereof, first and second ends of the contact frame being respectively engaged with the guide recesses in a manner that the contact frame is moveable up and down along guide recesses while maintaining a horizontal balance, the first and second springs being respectively positioned on upper surfaces of the first and second ends of the contact frame, the first and second spring caps being respectively mounted on the first and second springs, and the first and second spring caps being respectively secured to upper portions of the guide recesses.

\* \* \* \* \*